United States Patent [19]

Wang et al.

[11] Patent Number: 5,670,591
[45] Date of Patent: Sep. 23, 1997

[54] ANIONICALLY COPOLYMERIZED LIVING RANDOM (METH)ACRYLIC COPOLYMERS AND COPOLYMERS PREPARED THEREFROM

[75] Inventors: Jin-shan Wang, Pittsburgh, Pa.; Philippe Bayard, Stavelot; Philippe Teyssie, Neuville en Condroz, both of Belgium; Bruno Vuillemin; Philippe Heim, both of Pau, France

[73] Assignee: Elf Atochem S.A., Puteaux, France

[21] Appl. No.: 672,118

[22] Filed: Jun. 27, 1996

Related U.S. Application Data

[62] Division of Ser. No. 389,640, Feb. 16, 1995, Pat. No. 5,561,207.

[30] Foreign Application Priority Data

Feb. 16, 1994 [FR] France ................... 94 01767

[51] Int. Cl.$^6$ .................. C08F 4/46; C08F 2/00; C08F 220/40; C08F 222/10; C08F 224/00; C08F 232/08; C08F 220/54; C08F 220/44

[52] U.S. Cl. .................. 526/173; 526/183; 526/212; 526/262; 526/281; 526/273; 526/303.1; 526/328.5; 526/342

[58] Field of Search .................. 526/173, 183, 526/212, 262, 273, 281, 303.1, 328.5, 342

[56] References Cited

U.S. PATENT DOCUMENTS 5,019,634  5/1991  Boettcher et al. .................. 526/262
5,561,207  10/1996  Wang et al. .................. 526/262

Primary Examiner—Joseph L. Schofer
Assistant Examiner—Wu C. Cheng
Attorney, Agent, or Firm—Burns, Doane, Swecker & Mathis, L.L.P.

[57] ABSTRACT

Living random (meth)acrylic copolymers, facilely converted into random co(meth)acrylates and block copolymers thereof, comprise the anionic copolymerizates of at least one comonomer A with at least one comonomer B selected from among the (meth)acrylates and maleimides, at least one of the comonomers A and B comprising a (meth)acrylate, in the presence of (i) at least one alkali or alkaline earth metal, mono- or difunctional initiator and (ii) at least one ligand, for example a nonnitrogenous macrocyclic complexant, e.g., a crown ether, or an alkali metal alcoholate.

24 Claims, 1 Drawing Sheet

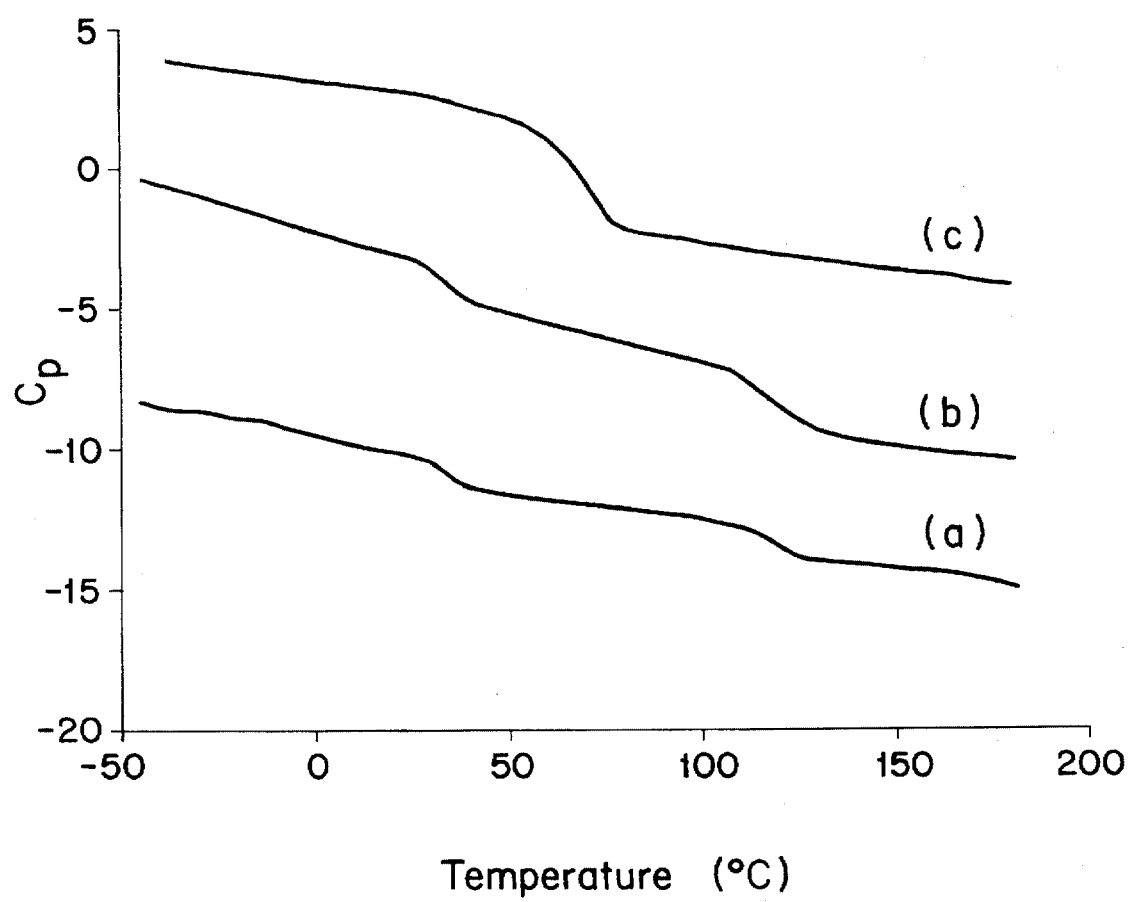

ANIONICALLY COPOLYMERIZED LIVING RANDOM (METH)ACRYLIC COPOLYMERS AND COPOLYMERS PREPARED THEREFROM

This application is a divisional, of application Ser. No. 08/389,640, filed Feb. 16, 1995.

BACKGROUND OF THE INVENTION

1. Field of the Invention

The present invention relates to living random (meth) acrylic copolymers, to copolymers and block copolymers prepared therefrom and to the corresponding processes for the production thereof via anionic copolymerization.

2. Description of the Prior Art

The provision of a completely living system for the copolymerization of (meth)acrylic monomers, in particular of (meth)acrylic esters, has long eluded the art of polymer synthesis. Partial solutions to this problem has been provided by the discoveries of group-transfer polymerization (Webster et al, *New Methods for polymerization Synthesis*, Mijs, W. S. ed., page 1, Plenum Press, New York (1992), of metal-free anionic polymerization (Reetz et al, *Angew. Chem. Int. Ed. Engl.*, 27, 1373 (1988)) and of the conventional carbanionic initiator modified with a ligand (Fayt et al, *Macromolecules*, 20, 1442 (1987); Varshney et al, ibid., 23, 2618 (1990); Varshney et al, ibid., 25, 4457 (1992); U.S. Pat. No. 4,056,580; Vicek et al, *J. Makromol. Chem., Rapid Commun.*, 13, 163 (1992); Kitayama et al, *Makromol. Chem.*, Supp. 1989, 15, 167; Ballard et al, *Macromolecules*, 25, 5907 (1992)). It has evolved that only this latter technique, were it to succeed, will provide a general mechanism enabling other monomers to be easily combined, among others the vinyl monomers and cyclic ethers, with (meth)acrylic monomers.

Although "living" anionic homopolymerization and "living" anionic block copolymerization of methacrylic and acrylic monomers (especially methacrylates and acrylates) have been recently developed to a fairly advanced degree, by virtue of the use of a number of effective ligands, living anionic random copolymerization of mixtures of these methacrylic and acrylic monomers is to date still very difficult. Because of the great difference in reactivity of the respective monomers, the group-transfer polymerization (GTP) technique does not permit the copolymerization of mixtures of acrylates and methacrylates (Webster et al, op. cit.). The same limitation is encountered in metal-free anionic polymerization (Reetz et al., op. cit.).

It has been demonstrated that the use of ligands forming mixed aggregates with the active center, such as LiCl, is an effective route for preventing the progress of the anionic polymerization from being perturbed by secondary transfer and termination reactions (Fayt et al, *Macromolecules*, 20, 1442 (1987); Varshney et al, ibid., 23, 2618 (1990); Varshney et al, ibid., 25, 4457 (1992)) for shifting the equilibria between various levels of aggregation of the active center towards a mixed aggregate, as indicated above (Kunkel et al, *Makromol. Chem., Makromol. Symp.*, 60, 315 (1992)). Utilizing this technique block copolymers of methyl methacrylic and tert-butyl acrylate have been synthesized with a predictable molecular weight and a narrow dispersity, whatever the monomer polymerized first (Varshney et al, *Macromolecules*, 24, 4997 (1991)). However, completely to the contrary, a simultaneous random or "tapered" (namely, producing a polymer whose composition along the backbone chain decreases in respect of a given monomer) copolymerization of these monomers does not proceed as expected and provides very mediocre results in respect of conversion and of distribution of the molecular weights, because of the presence of a selective nucleophilic attack on a highly sensitive methyl ester group by a sterically relatively unhindered poly(tert-butyl acrylate) anion, namely, of an intramolecular termination reaction via a "back-biting" mechanism (Jacobs et al, *Macromolecules*, 23, 4024 (1990)).

This "back-biting" mechanism can be represented as follows in the case of the copolymerization of methyl methacrylate with tert-butyl acrylate, it being possible for a tert-butyl acrylate endgroup to react with an antepenultimate methyl methacrylate residue along the polymer chain, i.e.:

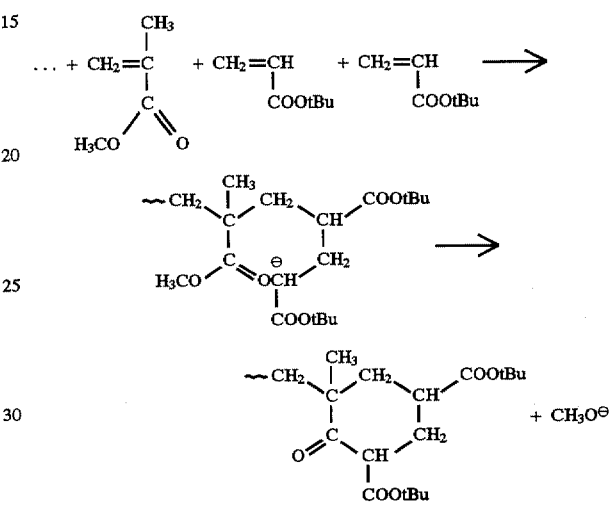

Thus, in the presence of LiCl as an initiator in tetrahydrofuran at −78° C., random copolymerization entailing (meth)acrylic monomers does not succeed.

SUMMARY OF THE INVENTION

Accordingly, a major object of the present invention is avoiding the above drawbacks by utilizing initiating systems complexed with well-defined ligands, to prepare living random copolymers having one of the general formulae (Ia) or (Ib):

$$[P(A-co-B)]^{\ominus}M^{\oplus}/n \text{ Ligand} \qquad (Ia)$$

$$M^{\oplus\ominus}[P(A-co-B)]^{\ominus}M^{\oplus}/2n \text{ Ligand} \qquad (Ib)$$

in which "P" and "co" represent the copolymerized state of at least two base comonomers A and B, said base comonomers being selected from among methacrylic and acrylic monomers and maleimides, at least one of such comonomers being an acrylic or methacrylic monomer; M is an alkali or alkaline earth metal emanating from a monofunctional or difunctional initiator, depending on whether the living random copolymer is represented by the formula (Ia) or (Ib), respectively; "Ligand" represents (a) a nonnitrogenous macrocyclic complexant; or (b) an alkali metal alcoholate of the formulae (II) or (III):

$$R^1(OR^2)_m OM^1 \qquad (II)$$

$$M^1(OR^2)_m OM^1 \qquad (III)$$

in which $M^1$ is an alkali metal; $R^1$ is a linear or branched alkyl radical having from 1 to 6 carbon atoms or an arylalkyl radical in which the alkyl moiety is $C_1$–$C_6$, or an alkylaryl radical in which the alkyl group has from 1 to 6 carbon atoms; $R_2$ is a linear or branched alkylene radical having from 2 to 4 carbon atoms; m is the integer 1, 2, or 3; and n is an integer ranging from 1 to 50.

BRIEF DESCRIPTION OF THE DRAWING

The FIGURE of Drawing illustrates the differential calorimetry (DSC) patterns of the samples which had already ben characterized by the 13C NMR spectroscopy.

DETAILED DESCRIPTION OF BEST MODE AND PREFERRED EMBODIMENTS OF THE INVENTION

More particularly according to the present invention, by the term "(meth)acrylic monomer" is intended a monomer selected from among the (meth)acrylates of the formulae:

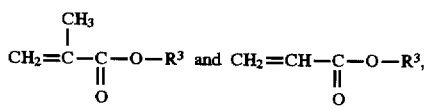

in which $R^3$ is selected from among primary, secondary or tertiary, linear or branched $C_1$–$C_{18}$ alkyl, $C_5$–$C_{18}$ cycloalkyl, ($C_1$–$C_{18}$ alkoxy)-$C_1$–$C_{18}$ alkyl, ($C_1$–$C_{18}$ alkylthio)-$C_1$–$C_{18}$ alkyl, aryl and arylalkyl radicals, such radicals optionally being substituted by at least one halogen atom and/or at least one hydroxyl group after protection of this hydroxyl group, and said alkyl radicals being linear or branched; and the glycidyl, norbornyl and isobornyl (meth)acrylates, methacrylonitrile and mono- and di-($C_1$–$C_{18}$ alkyl)-(meth)acrylamides.

Exemplary methacrylates of the above formula include methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, hydroxypropyl and hydroxybutyl methacrylates. The preferred methacrylic monomer is methyl methacrylate.

Exemplary acrylates of the above formula include methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

By the term "maleimide" as utilized herein is intended an unsubstituted maleimide monomer or an N-substituted maleimide monomer having the formula:

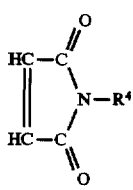

in which $R^4$ is an alkyl, arylalkyl, aryl or alkylaryl radical having from 1 to 12 carbon atoms. Exemplary thereof are N-ethylmaleimide, N-isopropylmaleimide, N-n-butylmaleimide, N-isobutylmaleimide, N-tert-butylmaleimide, N-n-octylmaleimide, N-cyclohexylmaleimide, N-benzylmaleimide and N-phenylmaleimide. The preferred maleimide is N-cyclohexylmaleimide.

The mixture of comonomers which is to be copolymerized according to the invention is a mixture of at least two comonomers, in any proportions, with the proviso that one such comonomer is acrylic or methacrylic in nature.

When the initiator of the initiating system according to the invention is a monofunctional initiator, it has, in particular, the general formula (IV):

$$R^5\text{—M} \qquad (IV)$$

in which $R^5$ is a straight or branched chain alkyl radical having from 2 to 6 carbon atoms; or an optionally substituted aryl radical containing one or more ring members; or a $C_2$–$C_6$ alkenyl radical substituted by aryl or alkylaryl radicals; or a linear or branched alkyl radical having from 1 to 6 carbon atoms, substituted by at least one phenyl group.

Such a monofunctional initiator is preferably selected from among sec-butyllithium, n-butyllithium, fluorenyllithium, alpha-methylstyryllithium, 1,1-diphenylhexyllithium (DPHLi), diphenylmethyllithium or -sodium or -potassium and 1,1-diphenyl-3-methylpentyllithium. The preferred initiator is diphenylmethyllithium.

The monofunctional initiator may also be any other known anionic initiator for the polymerization of methacrylates, such as, for example, α-lithioisobutyrates (methyl α-lithioisobutyrate), amides, and the like.

When the initiator of the initiating system according to the invention is a difunctional initiator, it has, in particular, the formula (V):

in which M is as defined above; $R^6$ is a substituted or unsubstituted, aliphatic, cycloaliphatic or aromatic divalent organic radical, or one comprising at least one cycloaliphatic or aromatic group; and each of $R^7$ and $R^8$ independently is a substituted or unsubstituted, aliphatic, cycloaliphatic or aromatic monovalent organic radical, or one comprising at least one cycloaliphatic or aromatic group.

Exemplary difunctional initiators of formula (V) include 1,1,4,4-tetraphenyl-1,4-dilithiobutane (TPDLB) and 1,1,4,4-tetraphenyl-1,4-disodiobutane.

Well-known precursors of difunctional initiators may also be employed, such as naphthalene lithium, naphthalene sodium, naphthalene potassium, and homologs thereof.

The preferred difunctional initiators are TPDLB and naphthalene lithium, naphthalene sodium, naphthalene potassium, and homologs thereof, employed in the presence of α-methylstyrene.

The ligand may be a nonnitrogenous macrocyclic complexing agent especially selected from among the cyclic polyethers (the crown ethers) and cyclic polythioethers such as, especially, macrocyclic polythioethers whose macrocyclic ring member has at least 14 carbon and oxygen atoms, each oxygen atom in the ring being separated from the other oxygen atoms in the ring by two or three carbon atoms; such macrocyclic polyethers are described in U.S. Pat. Nos. 3,687,978 and 4,826,941. A preferred ligand is 2,3,11,12-dibenzo-1,4,7,10,13,16-hexaoxacyclooctadeca-1,11-diene.

Other specific examples thereof include, especially:
1,4,7,10,13,16-Hexaoxacyclooctadecane;
2,3,12,13-Dibenzo-1,4,11,14-tetraoxacycloeicosa-2,12-diene;
2,3,12,13,22,23-Tribenzo-1,4,11,14,21,24-hexaoxacyclotriaconta-2,12,22-triene;
2,2,7,7,12,12,17,17-Octamethyl-21,22,23,24-tetraoxaquaterene;

2,3-Benzo-1,4,7,10,13-pentaoxacyclopentadec-2-ene;

2,3-(4'-t-Butyl)-1,4,7,10,13,16-hexaoxacyclooctadec-2-ene;

2,3,9,10-Dibenzo-1,4,8,11-tetraoxacyclotetradeca-2,9-diene;

2,3,32,33-Dibenzo-1,4,7,10,13,16,19,22,25,28,31,34,37,40,43,46,49,52,55,58-eicosaoxacyclohexaconta-2,32-diene;

2,3,16,17-Dibenzo-1,4,15,18-tetraoxacyclooctacosa-2,16-diene;

2,6,13,17-Tetraoxatricyclo[16.4.0.0$^{7,12}$]docosane;

2,5,8,15,18,21-Hexaoxatricyclo[20.4.0.0$^{9,14}$]hexacosane;

2,5,12,15,18-Pentaoxatricyclo[17.4.0.0$^{6,11}$]tricosane;

2,6,13,16,19-Pentaoxatricyclo[18.4.0.0$^{7,12}$]tetracosane;

9,10-Benzo-2,5,8,11,14,17-hexaoxabicyclo[16.4.0]docosa-9-ene;

2,3,9,10-Dibenzo-1,4,8,11,14,16-hexaoxacyclooctadeca-2,9-diene;

2,3,11,12-Dibenzo-1,4,7,10,13,16,18-heptaoxacycloeicosa-2,11-diene;

2,3,13,14-Dibenzo-8-pentamethylene-1,4,7,9,12,15,18-Heptaoxacycloeicosa-2,13-diene;

2,3,13,14-Dibenzo-1,4,7,9,12,15,18,20-octaoxacyclodocosa-2,13-diene;

2,4-(1',8'-naphthylene)-1,5,8,11,14-pentaoxacyclohexadec-2-ene.

Another ligand is a alcoholate of formula (II) or (III). Exemplary such alcoholates include those in which the radical $R^1$ is a methyl, ethyl, butyl and benzyl radical with $R^1$ advantageously being the methyl radical, and $R^2$ is the ethylene, propylene, butylene, isopropylene radical, preferably the ethylene radical. $M^1$ is lithium, sodium or potassium, and preferably lithium.

Specific examples thereof are the following:

$CH_3(OCH_2CH_2)OLi$;

$CH_3(OCH_2CH_2)_2OLi$;

$CH_3(OCH_2CH_2)_3OLi$;

$n-Bu(OCH_2CH_2)_2OLi$;

$Et(OCH_2CH_2)_2OLi$;

$Li(OCH_2CH_2)_2OLi$;

$Li(OCH_2CH_2)_3OLi$.

The alcoholates of formulae (II) and (III) are prepared, for example, by reacting $R^1(OR^2)_mOH$ or $H(OR^2)_mOH$, respectively, with any base whose pKA is higher than the pKA of the pair $R^1(OR^2)_mOM^1/R^1(OR^2)_mOH$ or of the pair $M_1(OR^2)_mOM^1/H(OR^2)_mOH$. Thus, lithium alcoholates can be prepared via reaction with metallic lithium, or via reaction with an organometallic lithium compound in a polar or apolar solvent.

The present invention also features a process for the preparation of living random copolymers as described above, comprising anionically copolymerizing at least one monomer A and at least one monomer B in the presence of an initiating system including:

(1) at least one monofunctional or difunctional initiator, especially of the formulae (IV) and (V), respectively, as defined above; and (2) at least one ligand selected from among (a) nonnitrogenous macrocyclic complexants, or (b) alkali metal alcoholates represented by the formulae (II) and (III), as defined above.

In this process, the proportion of ligand (a) employed may vary widely in relation to the initiator. This amount may be, for example, greatly in excess in relation to the molar amount of initiating agent. This amount may also be equal to or less than the molar amount of initiating agent. To obtain better results, the ligand(s)/initiator molar ratio in the initiating system according to the invention advantageously ranges from approximately 1 to approximately 50, preferably from approximately 1 to approximately 5.

The molar ratio of the ligand (b) to the initiator in the initiating system according to the invention may vary over very wide limits. The amount of alcoholate (II) or (III) must be sufficient to permit the formation of a complex with the active polymerization center and thus to stabilize the latter. The amount of alcoholate (II) or (III) depends on the initiator selected and on the monomers to be copolymerized. The molar ratio alcoholate (II) or (III)/initiator according to the invention generally ranges from 1 to 50. To obtain better results, this ratio preferably ranges from 3 to 10.

The copolymerization according to the present invention is carried out in the absence of moisture and of oxygen, in bulk or in the presence of at least one polar or apolar aprotic solvent preferably selected from among aromatic solvents such as benzene, toluene and ethylbenzene, or else tetrahydrofuran, diglyme, tetraglyme, ortho-terphenyl, biphenyl, decalin, tetralin or dimethylformamide, or mixture thereof. Exemplary preferred solvents include tetrahydrofuran, toluene or a mixture thereof.

The copolymerization temperature advantageously ranges from approximately −100° C. to +120° C., preferably from approximately −78° C. to +70° C., and more preferably from −40° C. to +10° C.

To obtain random copolymers from these living random copolymers, the latter are deactivated by reacting same with a source of protons, especially of an alcohol, water or a protonic acid; then, if appropriate, a transesterification or a hydrolysis in acidic medium of the resulting copolymer is conducted.

The random copolymers according to this invention which are thus obtained via anionic route and which include at least one recurring (meth)acrylic structural unit are novel polymers; they have a number-average molecular weight which typically ranges from 5,000 to 500,000 and a polydisperity value $\overline{Mw}/\overline{Mn}$ which typically ranges from 1.05 to 3. It should be appreciated that the random copolymers prepared via a radical route always have a polydisperity value higher than 1.5.

The random copolymers according to the present invention may be hydrolyzed at a temperature ranging from approximately 70° C. to 170° C., at a pressure ranging from 1 to 15 bars and in the presence of approximately 0.5% to 10% by weight, relative to the copolymer, of an acidic catalyst such as para-toluenesulfonic acid, methane toluenesulfonic acid or hydrochloric acid, in a polar solvent such as dioxane. After hydrolysis the copolymers comprising acrylic and/or methacrylic acid blocks may be precipitated in heptane, filtered, washed to remove any trace amounts of catalyst and, finally, dried. They may also be subsequently neutralized by means of methanolic potassium hydroxide or tetramethylammoinium hydroxide in solution in a mixture of toluene and methanol, to form the corresponding ionomers.

When at least one tertiary or secondary alkyl acrylate comprises the structure of a copolymer according to the invention, such acrylate structural units may also be transesterified in known manner into primary alkyl acrylate units.

Furthermore, the living random copolymers according to the invention may be converted, by block copolymerization, also by an anionic route, into block copolymers including at least one block based on a random copolymer of the invention, or prepared via the process of the invention, comprising at least one (meth)acrylic structural unit and a block or a plurality of blocks, which are identical or different, each based on a polymer other than the aforesaid random copolymer. The monomers for this or these additional blocks are selected, especially, from among acrylic and methacrylaic monomers and maleimides.

Such block copolymers may also be subjected, in the same manner as indicated above, to transesterification or hydrolysis.

In order to further illustrate the present invention and the advantages thereof, the following specific examples are given, it being understood that same are intended only as illustrative and in nowise limitative.

In said examples, the abbreviations have the following definitions:

MMA=methyl methacrylate;
tBuA=tert-butyl acrylate;
EA=ethyl acrylate;
Ph$_2$CHNA=diphenylmethylsodium;
DB-18-CE-6=2,3,11,12-dibenzo-1,4,7,10,13,16-hexaoxacyclooctadeca-2,11-diene;
THF=tetrahydrofuran;
AlEt$_3$=triethylaluminum;
NCHMI=N-cyclohexyylmaleimide;
ISOBORMA=isobornyl methacrylate.

EXAMPLES 1 to 15

Random copolymerization of MMA and of tBuA in the presence of the initiating system: Ph$_2$CHNa initiator/DB-18-CE-6 ligand:

General procedure:

The MMA and the tBuA were first vacuum-distilled over CaH$_2$ and then stored at −20° C. under nitrogen atmosphere. Prior to the polymerization, a solution of AlEt$_3$ at a concentration of 10% by weight in hexane was added thereto until a persistent yellowish-green coloration was observed. The mixture was then distilled at reduced pressure immediately before use.

DB-18-CE-6 was recrystallized from petroleum ether.

THF was purified by refluxing over a fresh benzophenone/sodium complex, a dark purple color indicating a solvent free from oxygen and moisture.

Ph$_2$CHNa was prepared by reacting diphenylmethane with naphthalene-sodium in THF for 24 hours at ambient temperature, the naphthalene/sodium solution resulting from the preliminary addition of sodium to naphthalene in THF at ambient temperature.

The anionic copolymerization of each mixture of MMA and of tBuA was conducted in a flamed glass reactor under nitrogen atmosphere. First, DB-18-CE-6, which was dried as described above, was introduced. The THF and the initiator were transferred into the glass reactor using a rubber septum and a stainless steel capillary or a syringe. The solution of initiator in THF containing the DB-18-CE-6 ligand was added dropwise until the color of the initiator persisted. After the addition of the desired amount of initiator corresponding to the required weight, the solution was cooled to −78° C., the required amount of mixture of MMA and tBuA was introduced and the copolymerization was conducted for a few seconds up to one hour, depending on the reactivity, and hence on the polymerization rate. The copolymerization was then stopped by adding acidic methanol and the copolymer was recovered by adding acidic methanol and the copolymer was recovered by precipitation in methanol or in a methanol/water mixture (50/50). The raw or crude polymer was vacuum-dried at 80° C. for 48 hours.

Characterization:

A steric exclusion chromatography (SEC) was performed employing a Hewlett-Packard 1090 liquid chromatography apparatus equipped with four columns ($10^5$, $10^3$, 500 and 100 Å) and a Hewlett-Packard 1037 A refractive index detector. Polystyrene standards were used for calibration and the number-average ($\overline{M}n$) and the weight average ($\overline{M}w$) molecular weights and the polydispersity of the polymer were calculated as a result. The glass transition temperature was measured by differential calorimetry (DSC) using a Dupont 9000 apparatus. The apparatus was calibrated with indium and mercury. The samples were first heated to 150° C., cooled rapidly to ambient temperature and then reanalyzed at a rate of 20° C./min. The composition and structure analyses of the copolymers were performed by means of $^1$H NMR and of $^{13}$C NMR using a Brucker AM 400 spectrometer.

The results obtained are reported in Table 1. It will be seen that the glass transition temperature decreased uniformly with the increase in the proportion of tBuA in the copolymer, which confirms a perfectly random copolymerization.

TABLE 1

Random copolymerization of MMA and of tBuA in THF at −78° C.:
Initiating system:
initiator: Ph$_2$CHNa    ligand: DB-18-CE-6

| Example | Molar ratio MMA | Molar ratio tBuA | Molar ratio [ligand]/ [initiator] | Conversion % | $\overline{M}n$ (SEC) | $\overline{M}w/\overline{M}n$ (SEC) | f* (SEC) | Molar ratio of tBuA in the copolymer ($^1$H NMR) | Tg (°C.) |
|---|---|---|---|---|---|---|---|---|---|
| 1 (ref.) | 1.00 | 0.00 | 2 | 100 | 14000 | 1.07 | 0.96 | 0.00 | 113 |
| 2 | 0.93 | 0.07 | " | 100 | 19400 | 1.08 | 0.86 | 0.10 | 111 |
| 3 | 0.88 | 0.12 | " | 100 | 19000 | 1.07 | 0.82 | 0.17 | 106 |
| 4 | 0.75 | 0.25 | " | 100 | 16500 | 1.11 | 0.92 | 0.19 | 89 |
| 5 | 0.52 | 0.48 | " | 96 | 15300 | 1.21 | 0.99 | 0.47 | 60 |
| 6 | 0.37 | 0.63 | " | 97 | 12000 | 1.35 | 1.20 | 0.72 | 43 |
| 7 | 0.10 | 0.90 | " | 94 | 14200 | 1.08 | 0.97 | 0.93 | 39 |
| 8 (ref.) | 0.00 | 1.00 | " | 100 | 16400 | 1.13 | 0.89 | 1.0 | 33 |
| 9 | 0.90 | 0.10 | " | 100 | 19400 | 1.10 | 0.91 | 0.10 | |

TABLE 1-continued

Random copolymerization of MMA and of tBuA in THF at −78° C.:
Initiating system:
initiator: Ph₂CHNa   ligand: DB-18-CE-6

| Example | Molar ratio MMA | Molar ratio tBuA | Molar ratio [ligand]/[initiator] | Conversion % | $\bar{M}n$ (SEC) | $\bar{M}w/\bar{M}n$ (SEC) | f* (SEC) | Molar ratio of tBuA in the copolymer (¹H NMR) | Tg (°C.) |
|---|---|---|---|---|---|---|---|---|---|
| 10 | 0.83 | 0.17 | " | 100 | 19000 | 1.05 | 0.90 | 0.15 | |
| 11 | 0.71 | 0.29 | " | 100 | 16500 | 1.10 | 0.92 | 0.30 | |
| 12 | 0.52 | 0.48 | " | 96.0 | 15300 | 1.20 | 0.99 | 0.48 | |
| 13 | 0.28 | 0.72 | " | 97.0 | 15000 | 1.25 | 0.93 | 0.71 | |
| 14 (comp.) | 0.20 | 0.80 | 0 | 6.8 | 3700 | 2.5 | 0.81 | 0.87 | |
| 15 | 0.07 | 0.93 | 2 | 94.0 | 14200 | 1.10 | 0.97 | 0.92 | |

*f = initiator efficiency = $Mn_{calculated}/Mn_{SEC}$ ($Mn_{calculated}$ = conversion × weight of the comonomers (g)/$C_{initiator}$ (mol))

In contrast to the Comparative Example carried out in the absence of DB-18-CE-6, in all cases the molecular weight distribution was narrow (1.05–1.20) with a unimodal symmetrical distribution. The living character of the anionic copolymerization of mixtures of MMA and of tBuA in THF at −78° C. employing Ph₂CHNa as initiator, in the presence of two molar equivalents of DB-18-CE-6, was also demonstrated. For this purpose, a first amount of mixture of MMA and tBuA (0.032 moles) was first polymerized (Ph₂CHNa, 5.96×10⁻⁴ moles; DB-18-CE-6/Ph₂CHNa=2.0) in THF at −78° C. and, 30 minutes later, the same amount of comonomers was added. As a result, the SEC trace clearly evidenced that, during the addition of the second amount of comonomers, the SEC peak shifted towards the position of the higher molecular weights without contamination of the original PMMA-co-PtBuA. The $\bar{M}n$ of the original copolymer was 6,200 ($\bar{M}w/\bar{M}n$=1.10, f=0.92) and, entirely consistently, the $\bar{M}n$ of the final copolymer was 12,500 ($\bar{M}w/\bar{M}n$=1.10, f=0.99).

It will also be seen that the conversion of the monomers was quantitative (95–100%), that the initiation efficiency was high (on average 0.93) and that the comonomer composition in the resulting copolymers was very close to that of the initial feed.

On comparing the ¹³C NMR MH_z spectra in the region of the carbonyl groups of PMMA and PtBuA units at 173.5–180.2 ppm, recorded in CDCl₃ at 40° C., of a random PMMA-co-PtBuA (Example 11, Table 1), of a block PMMA-b-PtBuA (block copolymerization under the same conditions as the above random copolymerization: 0.1 moles of MMA; 0.083 moles of tBuA; 0.80×10⁻³ moles of Ph₂CHNa initiator; conversion: 100%) and of an equimolar mixture of homo-PMMA and of homo-PtBuA, it was determined that the PMMA-co-PtBuA copolymer thus prepared was not a block copolymer, nor a mixture of the two corresponding homopolymers, but a random copolymer.

These conditions were confirmed by DSC measurements. The FIGURE of Drawing illustrates the DSC patterns of the samples which had already been characterized by the ¹³CNMR spectroscopy described above. In the case of the PMMA-b-PtBuA block copolymer and of the mixture of the two corresponding homopolymers (curves (a) and (b), respectively), two separate transitions appear at approximately 22° C. and 102° C., which are characteristic of the PtBuA and PMMA blocks, respectively. This confirmed that there was considerable phase separation between PMMA and PtBuA. On the other hand, a single Tg of 67° C. was detected in the case of the PMMA-co-PtBuA random copolymer (curve (c)).

EXAMPLES 16 to 28

The procedure of the preceding examples was repeated, but replacing the Ph₂CHNa with Ph₂CHLi and the DB-18-CE-6 with CH₃OCH₂CH₂OCH₂CH₂OLi. The results obtained are reported in the Table 2 which follows:

TABLE 2

Random copolymerization of MMA and of tBuA:
Initiating system:
initiator: Ph₂CHLi   ligand: MeOCH₂CH₂OCH₂CH₂OLi

| Example | Monomers (mol %) MMA | Monomers (mol %) tBuA | Molar ratio [ligand]/[initiator] | T (°C.) | Solvent | Conversion (%) | $\bar{M}n$ (SEC) | $\bar{M}w/\bar{M}n$ | f | tBuA in the copolymer (mol %) | Tg (°C.) |
|---|---|---|---|---|---|---|---|---|---|---|---|
| 16 (ref.) | 0.0 | 100.0 | 10 | −78 | THF | 100 | 17000 | 1.09 | 0.90 | | |
| 17 | 7.5 | 92.5 | 10 | " | " | 100 | 21000 | 1.12 | 0.88 | | |
| 18 | 23.8 | 76.2 | 10 | " | " | 100 | 20200 | 1.14 | 0.96 | | |
| 19 | 42.2 | 57.8 | 10 | " | " | 100 | 21700 | 1.14 | 0.86 | 42 | 78 |
| 19 bis | " | " | 5 | " | " | 85 | 18500 | 1.22 | 0.83 | 44 | 80 |
| 19 ter | " | " | 2 | " | " | 86 | 42600 | 1.29 | 0.37 | 45 | 82 |
| 19 quater | " | " | 1 | " | " | 80 | 77850 | 1.52 | 0.19 | 37 | 70 |

TABLE 2-continued

Random copolymerization of MMA and of tBuA:
Initiating system:
initiator: Ph$_2$CHLi    ligand: MeOCH$_2$CH$_2$OCH$_2$CH$_2$OLi

| Example | Monomers (mol %) MMA | Monomers (mol %) tBuA | Molar ratio [ligand]/ [initiator] | T (°C.) | Solvent | Conversion (%) | $\bar{M}n$ (SEC) | $\bar{M}w/\bar{M}n$ | f | tBuA in the copolymer (mol %) | Tg (°C.) |
|---|---|---|---|---|---|---|---|---|---|---|---|
| 20 | 63.0 | 37.0 | 10 | " | " | 95 | 17400 | 1.26 | 0.97 | | |
| 21 | 86.8 | 13.2 | 10 | " | " | 95 | 19600 | 1.34 | 0.85 | | |
| 22 (ref.) | 100.0 | 0.0 | 10 | " | " | 98 | 20000 | 1.45 | 0.87 | | |
| 23 (ref.) | 0.0 | 100.0 | 10 | −40 | Toluene/THF (9/1 v/v) | 98 | 32000 | 1.17 | 0.54 | | |
| 24 | 7.5 | 92.5 | 10 | " | Toluene/THF (9/1 v/v) | 100 | 32000 | 1.30 | 0.55 | | |
| 25 | 23.8 | 76.2 | 10 | " | Toluene/THF (9/1 v/v) | 99 | 32100 | 1.40 | 0.56 | | |
| 26 | 42.2 | 57.8 | 10 | " | Toluene/THF (9/1 v/v) | 97 | 34200 | 1.30 | 0.52 | | |
| 27 | 63.0 | 37.0 | 10 | " | Toluene/THF (9/1 v/v) | 90 | 30200 | 1.63 | 0.54 | | |
| 28 | 86.0 | 13.2 | 10 | " | Toluene/THF (9/1 v/v) | 98 | 32100 | 1.35 | 0.54 | | |

EXAMPLES 29 to 33

MMA/NCHMI random copolymerization:

The procedure of Example 17 was repeated, but an initiator was employed that was prepared by reacting, at ambient temperature, the naphthalene potassium solution which was the result of the preliminary addition of potassium to naphthalene in THF, with α-methylstyrene. The molar ratio of the ligand to the initiator was 10. The solvent employed was THF. The results obtained are reported in Table 3:

TABLE 3

Copolymerization of a mixture of MMA and of NCHMI by initiation with the napthalene potassium/α-MeSt/MeOCH$_2$CH$_2$OCH$_2$CH$_2$OLi system in THF at −78° C.:

| Example | NCHMI weight % | MMA weight % | Time (hours) | Conversion (%) | $\bar{M}n_{calculated}$ | $\bar{M}n_{SEC}$ | $\bar{M}w/\bar{M}n$ | (°C.) |
|---|---|---|---|---|---|---|---|---|
| 29 | 5 | 95 | 10 | 96 | 22500 | 38200 | 1.21 | 121 |
| 30 | 10 | 90 | 10 | 100 | 24300 | 47000 | 1.35 | 123 |
| 31 | 15 | 85 | 10 | 100 | 24800 | 52300 | 1.24 | 125 |
| 32 | 20 | 80 | 10 | 100 | 23500 | 30200 | 1.42 | 130 |
| 33 | 100 | — | 10 | 100 | 16000 | 39600 | 1.41 | 260 |

EXAMPLES 34 to 36

MMA/ISOBORMA random copolymerization:

The procedure of Example 17 was repeated. The polymerization temperature was −20° C. The initiator and the ligand were those of Example 17. The molar ratio of the ligand to the initiator was 10. The results obtained are reported in Table 4. The high Tg of the copolymer products is apparent. The polymerization technique therefore produced materials whose behavior when heated was good.

TABLE 4

MMA/ISOBORMA random copolymerization:

| Example | Monomers | Solvent | Monomer molar composition | $\overline{Mn}_{SBC}$ | Mw/Mn | Tg (°C.) |
|---|---|---|---|---|---|---|
| 34 | MMA/ISOBORMA | Toluene/THF 90/10 (v/v) | 90/10 | 90 000 | 1.6 | 136 |
| 35 | MMA/ISOBORMA | THF | 80/20 | 30 000 | 1.6 | 140 |
| 36 | MMA/ISOBORMA | Toluene/THF 90/10 (v/v) | 50/50 | 39 000 | 2.9 | 153 |

EXAMPLES 37 to 39

MMA/EA random copolymerization:

The procedure of Example 17 was repeated. The total concentration in the reactor was 5% relative to the solvent and monomer composition. The solvent employed was toluene. The ligand/initiator ratio was 10. The polymerization temperature was −30° C. The calculated molecular weight was 50,000. The results obtained are reported in Table 5:

TABLE 5

MMA/EA random copolymerization:

| | Monomers | | | | |
|---|---|---|---|---|---|
| Example | EA % by weight | MMA % by weight | Conversion (%) | $\overline{Mn}_{SBC}$ | $\overline{Mw}/\overline{Mn}$ |
| 37 | 1.0 | 99.0 | 100 | 117600 | 1.5 |
| 38 | 3.3 | 96.7 | 60 | 55500 | 1.7 |
| 39 | 6.0 | 95.0 | 60 | 42750 | 1.85 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a living random (meth) acrylic copolymer having one of the formulae (Ia) or (Ib):

[P(A—co—B)]$^{\ominus}$M$^{\oplus}$(n Ligand)      (Ia)

M$^{\oplus\ominus}$[P(A—co—B)]$^{\ominus}$M$^{\oplus}$(2n Ligand)   (Ib)

in which "P" and "co" represent the copolymerizate of at least two base comonomers A and B selected from among methacrylic and acrylic monomers and maleimides, at least one of said comonomers A and B comprising an acrylic or methacrylic monomer; M is an alkali or alkaline earth metal emanating from a monofunctional or difunctional polymerization initiator, depending on whether said living random copolymer has the formula (Ia) or (Ib), respectively; "Ligand" is (a) a non-nitrogenous macrocyclic complexant or (b) an alkali metal alcoholate of the formulae (II) or (III):

R$^1$(OR$^2$)$_m$OM$^1$      (II)

M$^1$(OR$^2$)$_m$OM$^1$     (III)

in which M$^1$ is an alkali metal; R$^1$ is a linear or branched alkyl radical having from 1 to 6 carbon atoms or an arylalkyl radical in which the alkyl moiety is $C_1$–$C_6$, or an alkylaryl radical in which the alkyl moiety has from 1 to 6 carbon atoms; R$^2$ is a linear or branched alkylene radical having from 2 to 4 carbon atoms; m is the integer 1, 2, or 3; and n is an integer ranging from 1 to 50, said process comprising anionically polymerizing said comonomers A and B in the presence of (i) at least one alkali or alkaline earth metal, mono- or difunctional initiator thereof and (ii) at least one Ligand which comprises (a) said non-nitrogenous macrocyclic complexant or (b) said alkali metal alcoholate.

2. The process as defined by claim 1, wherein said methacrylic monomers are selected from among methacrylates having the formula:

$$CH_2=C-C-O-R^3$$
$$\quad\;\;|\quad\;\;||$$
$$\quad CH_3\;\;O$$

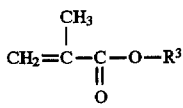

in which R$^3$ is a primary, secondary or tertiary, linear or branched $C_1$–$C_{18}$ alkyl, $C_5$–$C_{18}$ cycloalkyl, ($C_1$–$C_{18}$ alkoxy)-$C_1$–$C_{18}$ alkyl, ($C_1$–$C_{18}$ alkylthio)-$C_1$–$C_{18}$ alkyl, aryl or arylalkyl radical or substituted such radical bearing at least one halogen atom and/or at least one protected hydroxyl group, the alkyl moieties of which being linear or branched; or a glycidyl, norbornyl or isobornyl methacrylate, methacrylonitrile or mono- or di-($C_1$–$C_{18}$ alkyl) methacrylamide.

3. The process as defined by claim 1, wherein said acrylic monomers are selected from among acrylates having the formula:

$$CH_2=CH-C-O-R^3$$
$$\qquad\qquad\;||$$
$$\qquad\qquad\;O$$

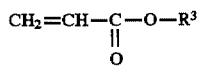

in which R$^3$ is a primary, secondary or tertiary, linear or branched $C_1$–$C_{18}$ alkyl, $C_5$–$C_{18}$ cycloalkyl, ($C_1$–$C_{18}$ alkoxy)-$C_1$–$C_{18}$ alkyl, ($C_1$–$C_{18}$ alkylthio)-$C_1$–$C_{18}$ alkyl, aryl or arylalkyl radical or substituted such radical bearing at least one halogen atom and/or at least one protected hydroxyl group, the alkyl moieties of which being linear or branched; or a glycidyl, norbornyl or isobornyl acrylate, acrylonitrile or a di-($C_1$–$C_{18}$ alkyl)acrylamide.

4. The process as defined by claim 1, wherein said maleimides are selected from among maleimide or a maleimide compound having the formula:

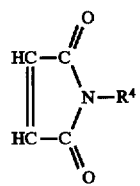

in which R$^4$ is an alkyl, arylalkyl, aryl or alkylaryl radical having from 1 to 12 carbon atoms.

5. The process as defined by claim 1, wherein said comonomer A is methyl methacrylate and comonomer B is tert-butylacrylate.

6. The process as defined by claim 1, wherein said M emanates from a monofunctional initiator having the formula (IV):

R$^5$—M      (IV)

in which R$^5$ is a straight or branched chain alkyl radical having from 2 to 6 carbon atoms, an optionally substituted aryl radical having one or more ring members, a $C_2$–$C_6$ alkenyl radical substituted by aryl or alkylaryl substituents, or a linear or branched alkyl radical having from 1 to 6 carbon atoms, substituted by at least one phenyl group; or from an anionic methacrylate initiator.

7. The process as defined by claim 6, wherein said monofunctional initiator having the formula (IV) comprises sec-butyllithium, n-butyllithium, fluorenyllithium, alphamethylstyryllithium, 1,1-diphenylhexyllithium, diphenylmethyllithium or -sodium or -potassium, or 1,1-diphenyl-3-methylpentyllithium.

8. The process according to claim 1, wherein said M emanates from a difunctional initiator having the formula (V):

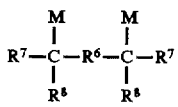
(V)

in which $R^6$ is an optionally substituted aliphatic, cycycloaliphatic or aromatic divalent organic radical, and each of $R^7$ and $R^8$ independently is an optionally substituted aliphatic, cycloaliphatic or aromatic monovalent organic radical.

9. The process as defined by claim 8, wherein said difunctional initiator of formula (V) comprises 1,1,4,4-tetraphenyl-1,4-dilithiobutane (TPDLB) or 1,1,4,4-tetraphenyl-1.4-disodiobutane.

10. The process as defined in claim 1, wherein said M emanates from a difunctional initiator precursor comprising naphthalene lithium, naphthalene sodium, naphthalene potassium, or homologs thereof.

11. The process as defined by claim 1, wherein said M emanates from a difunctional initiator precursor comprising naphthalene lithium, naphthalene sodium, naphthalene potassium, or homologs thereof, together with α-methylstyrene.

12. The process as defined by claim 1, wherein said Ligand comprises a cyclic polyether or cyclic polythioether macrocyclic complexant.

13. The process as defined by claim 12, wherein said macrocyclic complexant comprises 2,3,11,12-dibenzo-1,4,7,10,13,16-hexaoxacyclooctadeca-1,11-diene (DB-18-CE-6).

14. The process as defined by claim 1, wherein said Ligand comprises an alkali metal alcoholate of formula (II) or (III), in which $R^1$ is methyl, ethyl, butyl or benzyl; $R^2$ is ethylene, propylene, butylene or isopropylene; and $M^1$ is lithium, sodium or potassium.

15. The process as defined by claim 1, said at least one Ligand (ii) comprising said macrocyclic complexant (a), and the molar ratio of Ligand (a)/initiator (i) is between about 1 and about 50.

16. The process as defined by claim 15, said molar ratio is between about 1 and about 5.

17. The process as defined by claim 1, said at least one Ligand (ii) comprising said alkali metal alcoholate (b), and the molar ratio of Ligand (b)/initiator (i) is between about 1 and about 50.

18. The process as defined by claim 17, said molar ratio is between about 3 and about 10.

19. The process as defined by claim 1, carried out at a temperature between about −100° C. and about +120° C.

20. The process as defined by claim 19, carried out at a temperature between about −78° C. and about +70° C.

21. The process as defined by claim 1, carried out in the absence of moisture and oxygen.

22. The process as defined by claim 21, carried out in bulk or in at least one polar or nonpolar aprotic organic solvent.

23. The process as defined by claim 22, carried out in an aprotic organic solvent comprising benzene, toluene, ethylbenzene, tetrahydrofuran, diglyme, tetraglyme, orthoterphenyl, biphenyl, decaline, tetralin, dimethylformamide, or mixtures thereof.

24. The process as defined by claim 23, said aprotic organic solvent comprising tetrahydrofuran, toluene, or mixtures thereof.

* * * * *